US011417552B2

(12) United States Patent
Zimmer et al.

(10) Patent No.: US 11,417,552 B2
(45) Date of Patent: Aug. 16, 2022

(54) METHOD AND DEVICE FOR DETERMINING A FEATURE FOR DEVICES PRODUCED ON A WAFER

(71) Applicant: Robert Bosch GmbH, Stuttgart (DE)

(72) Inventors: Christoph Zimmer, Korntal (DE); Dusan Radovic, Stuttgart (DE); Eric Sebastian Schmidt, Heimsheim (DE); Matthias Kuehnel, Boeblingen (DE); Michael Herman, Sindelfingen (DE); Wenqing Liu, Weil der Stadt (DE); Jan Martin Lubisch, Ponn (DE)

(73) Assignee: Robert Bosch GmbH, Stuttgart (DE)

( * ) Notice: Subject to any disclaimer, the term of this patent is extended or adjusted under 35 U.S.C. 154(b) by 147 days.

(21) Appl. No.: 17/002,675

(22) Filed: Aug. 25, 2020

(65) Prior Publication Data

US 2021/0111046 A1 Apr. 15, 2021

(30) Foreign Application Priority Data

Oct. 10, 2019 (DE) .......................... 102019215571.5

(51) Int. Cl.
| | |
|---|---|
| *H01L 21/67* | (2006.01) |
| *H01L 21/66* | (2006.01) |
| *G06N 20/00* | (2019.01) |
| *G05B 13/04* | (2006.01) |

(52) U.S. Cl.
CPC ........ *H01L 21/67259* (2013.01); *G05B 13/04* (2013.01); *G06N 20/00* (2019.01); *H01L 21/67288* (2013.01); *H01L 22/12* (2013.01); *G06F 2101/14* (2013.01)

(58) Field of Classification Search
CPC ......... H01L 21/67259; H01L 21/67288; H01L 22/12; H01L 22/20; H01L 22/10; G05B 13/04; G06N 20/00; G06F 2101/14; G06F 30/392
See application file for complete search history.

(56) References Cited

PUBLICATIONS

Kupp et al., "Spatial Estimation of Wafer Measurement Parameters Using Gaussian Process Models," 2012 IEEE International Test Conference, 2012, pp. 1-8.
Kupp, et al.: Spatial Correlation Modeling for Probe Test Cost Reduction in RF devices, 2012 IEEE/ACM International Conference on Computer-Aided Design (ICCAD), San Jose, CA, (2012), pp. 23-29.

*Primary Examiner* — Tejal Gami
(74) *Attorney, Agent, or Firm* — Norton Rose Fulbright US LLP; Gerard Messina

(57) ABSTRACT

A computer-implemented method for inferring a device feature of a device produced on a wafer. The method includes: providing a wafer feature model associating a wafer position indicating a position of a produced device on the wafer to a device feature, wherein the wafer feature model is configured to be trained by one or more wafer feature maps and particularly configured as a Gaussian process model, providing a sample device feature of at least one device at a sample wafer position, and inferring the device feature of at least one other device of the wafer depending on the provided wafer feature model.

14 Claims, 3 Drawing Sheets

METHOD AND DEVICE FOR DETERMINING A FEATURE FOR DEVICES PRODUCED ON A WAFER

CROSS REFERENCE

The present application claims the benefit under 35 U.S.C. § 119 of German Patent Application No. DE 102019215571.5 filed on Oct. 10, 2019, which is expressly incorporated herein by reference in its entirety.

FIELD

The present invention relates to associating features to devices produced on a wafer.

BACKGROUND INFORMATION

Presently, in final testing of devices produced on a wafer, such as chips, each device is measured or tested individually before or after separation of the devices. The measurement/testing aims to obtain one or more device features including an indication about functionality/errors or other data used to determine one or more training or calibration parameters. The calibration parameters are, e.g., used to set calibration bits, which is particularly common for calibrating integrated sensors.

Even after separating the devices, the devices can be identified by a unique wafer ID and can thereby be retracked to a specific position on the wafer. With this method, wafer maps can be reconstructed by plotting the device feature obtained during the measurement/testing process over the reconstructed position in the wafer map.

Due to the various process steps during the fabrication of the devices on the wafers, distinct patterns can be observed on the wafer maps. These patterns originate from process variations, such as etch loss, trench angle mismatch and the like, induced by the processing equipment and on intrinsic variations over the wafer surface.

Also for different wafers produced with same the same devices, i.e., obtained by identical mask layouts and processing steps, the devices will show very similar patterns of device features with respect to their wafer maps.

SUMMARY

In accordance with an example embodiment of the present invention, a method for determining one or more device features for devices produced on a wafer based on sample measurements, and a device are provided.

Further embodiments are described herein.

According to a first aspect of the present invention, a method for determining a device feature of a device produced on a wafer is provided, comprising the steps of:
  Providing a wafer feature model associating a wafer position indicating a position of a produced device on a wafer to a device feature, wherein the wafer feature model is configured to be trained by one or more wafer feature maps and particularly configured as a Gaussian process model;
  Providing a sample device feature of at least one device at a subset of of sample wafer positions; and
  Determining the device feature of at least one other device of the (same) wafer depending on the provided wafer feature model.

According to the above example method, a device feature model is provided which is trained to associate wafer positions of devices produced on a wafer to one or more device features. The one or more device features may include an indication about functionality/errors or other data such as one or more training or calibration parameters.

Moreover, the wafer feature model may be non-parametric which can be trained using sample data. Furthermore, the wafer feature model may provide an uncertainty value for a predicted feature.

Furthermore, in addition to the wafer positions, the device feature model may optionally associate one or more further operating parameters to the one or more device features.

By means of the device features, a wafer feature map can be build for the wafer positions. Using such a wafer feature map, sample wafer positions of devices can be determined which shall be used for measurement/testing/probing of the respective device features. The subset of the wafer positions may include one or more sample wafer positions. The results of the testing/measuring the devices at the subset of wafer positions are used for determining the respective device features of the devices at the other wafer positions.

The sample wafer positions may be determined by minimizing the predictive uncertainty in terms of given requirement violations. Thereby, only a few devices can be selected for testing/measuring to obtain the corresponding one or more device features which allows to determine the respective device feature for the other devices produced on the same wafer.

Using by the device feature model, the above example method allows to obtain features for all devices of the same or other wafers produced with identical devices just by determining corresponding one or more device features at sample wafer positions. Therefore, the present invention takes advantage of similar patterns of the distribution of one or more device features, which are a result of the common processing steps and processing parameters used for wafer production, for prediction of device features.

By replacing the expensive determination (including physical measurement and testing) of all device features for all devices of the wafer with a corresponding determination for a preselected subset of devices, measurement/testing costs can be reduced significantly. Depending on the accuracy of the wafer feature model and given specification limits for the determined features, only a small part of the devices need to be tested/measured.

Furthermore, the device feature may include of one: an indication of functionality, an indication of an error, an indication whether the device fulfils a given specification, and a calibration parameter to be written/stored into the specific device.

It may be provided that the wafer feature model additionally associates environmental and/or operating conditions to the device feature.

According to an example embodiment of the present invention, the wafer feature model may be trained by providing a number of processed wafers including identical devices, wherein particularly the processed wafers include one or more corner lot wafers.

It may be provided that the sample device feature of the at least one device is obtained at a selected discrete subset of wafer positions which maximizes the likelihood of all samples on the wafer being inside given specification limits.

According to an example embodiment of the present invention, the selected discrete subset of wafer positions is selected by maximizing the likelihood of all samples on the wafer being inside given specification limits $s_{lim}$ according to $$p(d(f) \leq s_{lim}) \geq p_{min}$$

wherein $$d(f) = \sum_{i \in X} |f_{mod}(i) - f_{des}|$$

and $p_{min}$ is a lower bound on the minimum probability that the specification limit $s_{lim}$ is satisfied per sample, wherein X is the set of all wafer positions, $f_{mod}$ is a modelled feature and $f_{des}$ is the nominal feature which shall be met for the device at the specific position i.

Furthermore, a limit violation v may be specified as $$v = p\left(\min_{f_{mod}(i)} d(f) \leq s_{acc}\right)$$

wherein the subset of wafer positions is selected to minimize the probability of expected limit violations over all devices of the wafer.

It may be provided that the subset of wafer positions is updated by means of an acquisition function $$a(\chi_{samp}) = \mathbb{E}_{\psi_{samp} \sim p(\psi|\chi, \mathcal{D}, \theta, \phi)}[v(y_{samp} - \mathbb{E}_{\sim p(\psi|\chi, \mathcal{D}_{\chi_{samp}}, \psi_{samp}, \theta, \phi)}[v(y)]]$$

wherein the selecting of the wafer position s for the optimized subset of wafer positions, the acquisition function is evaluated for all possible combinations of wafer positions, wherein the subset of wafer positions with the lowest expected limit violation is selected.

Furthermore, the device feature model may be provided using a prior for the patterns of the corresponding based on prior technological knowledge of the fabrication steps using the processing equipment.

According to another aspect of the present invention, an example computer-implemented method for production of devices on a wafer is provided, comprising the steps of:

Controlling a production of the devices on one or more wafers;

Determining of a device feature for the devices by means of the above method, wherein the production of the devices is controlled depending on the determined device feature.

Moreover, the respective device feature may be written into a memory of the devices, particularly as a respective calibration parameter. Additionally or alternatively, the devices are classified or rejected depending on the respective device feature. Furthermore, it may be provided that the production of the devices is halted depending on the respective device features of the devices.

According to a further aspect of the present invention, an example system for determining a device feature of a device produced on a wafer is provided, wherein the system is configured to perform the steps of:

Providing a wafer feature model associating a wafer position indicating a position of a produced device on a wafer to a device feature, wherein the wafer feature model is configured to be trained by one or more wafer feature maps and particularly configured as a Gaussian process model;

Providing a sample device feature of at least one device at a sample wafer position;

Determining the device feature of at least one other device of the wafer depending on the provided wafer feature model.

According to a further aspect of the present invention, an example system for production of devices on a wafer is provided, wherein the system is configured to perform the steps of:

Controlling a production of the devices on one or more wafers;

Providing a wafer feature model associating a wafer position indicating a position of a produced device on a wafer to a device feature, wherein the wafer feature model is configured to be trained by one or more wafer feature maps and particularly configured as a Gaussian process model;

Providing a sample device feature of at least one device at a sample wafer position;

Determining the device feature of at least one other device of the wafer depending on the provided wafer feature model.

wherein the system is further configured to control production of the devices depending on the determined device feature.

BRIEF DESCRIPTION OF THE DRAWINGS

Example embodiments of the present invention are described in more detail below in conjunction with the figures.

DETAILED DESCRIPTION OF EXAMPLE EMBODIMENTS

Figure 1:
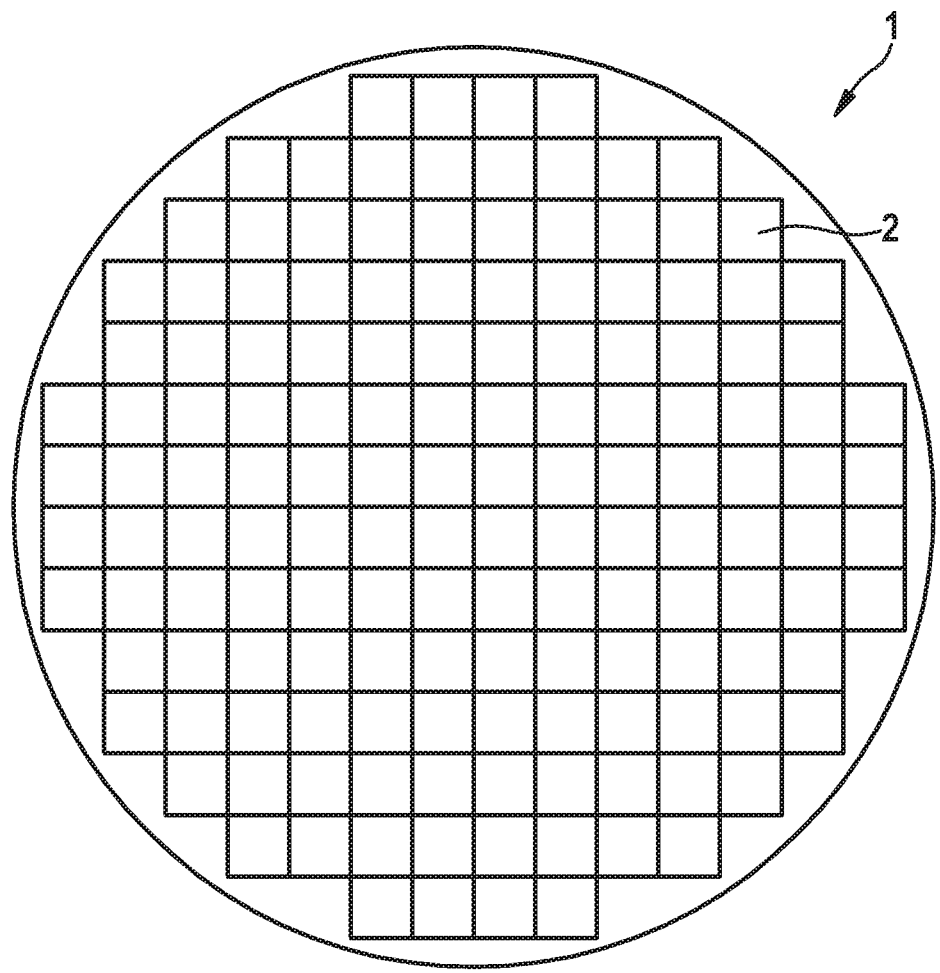
FIG. 1 shows an exemplary arrangement of devices on a wafer.

The present invention is described in more detail using the example of the production of acceleration sensors which are produced on wafers including a number of identical sensor devices. FIG. 1 shows an exemplary arrangement of such devices 2 on a wafer 1.

The production of the acceleration sensors requires a high number of processing steps applying processing parameters on a wafer level such as lithography, etching, annealing treatments and the like. Due to the characteristics of these processing steps and due to process variations, distinct patterns of device feature variations develop over the wafer. Such device features may include an indication of functionality, an indication of an error, an indication whether the device fulfils a given specification, and a calibration parameter to be stored into the specific device.

For identical products on a number of wafers, those patterns are similar even under normal process parameter variations.

For the given example for acceleration sensors, the functional output is an acceleration value Output(Acc) which is determined according to the following formula:

$$\text{Output}(Acc) = (\text{Offset}_{raw} + \text{Offset}(T)) -$$
$$(OTrim_{raw} + OTrim_{T1} * T + OTrim_{T2} * T^2 + \ldots) +$$
$$(\text{Sense}_{raw}(Acc) + \text{Sense}_T(Acc, T)) *$$
$$(STrim_{raw} + STrim_{T1} * T + STrim_{T2} * T^2 + \ldots)$$

where $\text{Offset}_{raw}$ as well as $\text{Offset}_T$ are inherent constant offset and temperature-dependent offset, respectively, and $\text{Sense}_{raw}(ACC)$ as well as $\text{Sense}_T(ACC)$ are inherent response and temperature-dependent response to external stimuli (ACC which is the actual acceleration applied), such as the acceleration that the sensor should detect. Furthermore, calibration parameters $OTrim_x$ and $STrim_x$ have to be determined to be written into a calibration memory of each of the devices so that the functional output Output(Acc) of the sensor substantially corresponds to the true physical value of the acceleration Truevalue (ACC). The role of the measurement procedure after completing manufacturing of the raw chips is to determine the calibration parameters so that the sensor device 2 behavior satisfies the following criteria:

$$\text{Output}(Acc, OTrim_y, OTrim_x, \quad . \quad . \quad . \quad)-$$
$$\text{Truevalue}(Acc) \leq s_{lim}$$

With an actual acceleration Truevalue(Acc) applied and a given sensor specification limit $s_{lim}$.

In general the criteria for non calibration parameters such as testing results or any characteristics as device feature $\mathcal{Y}$ may be defined as:

$$\mathcal{Y}_{samp} - \mathcal{Y}_{des} \leq s_{lim}$$

Wherein $\mathcal{Y}_{samp}$ corresponds to the measured feature value, and $\mathcal{Y}_{des}$ corresponds to the desired device feature value and $s_{lim}$ to the specification limit.

Figure 2:
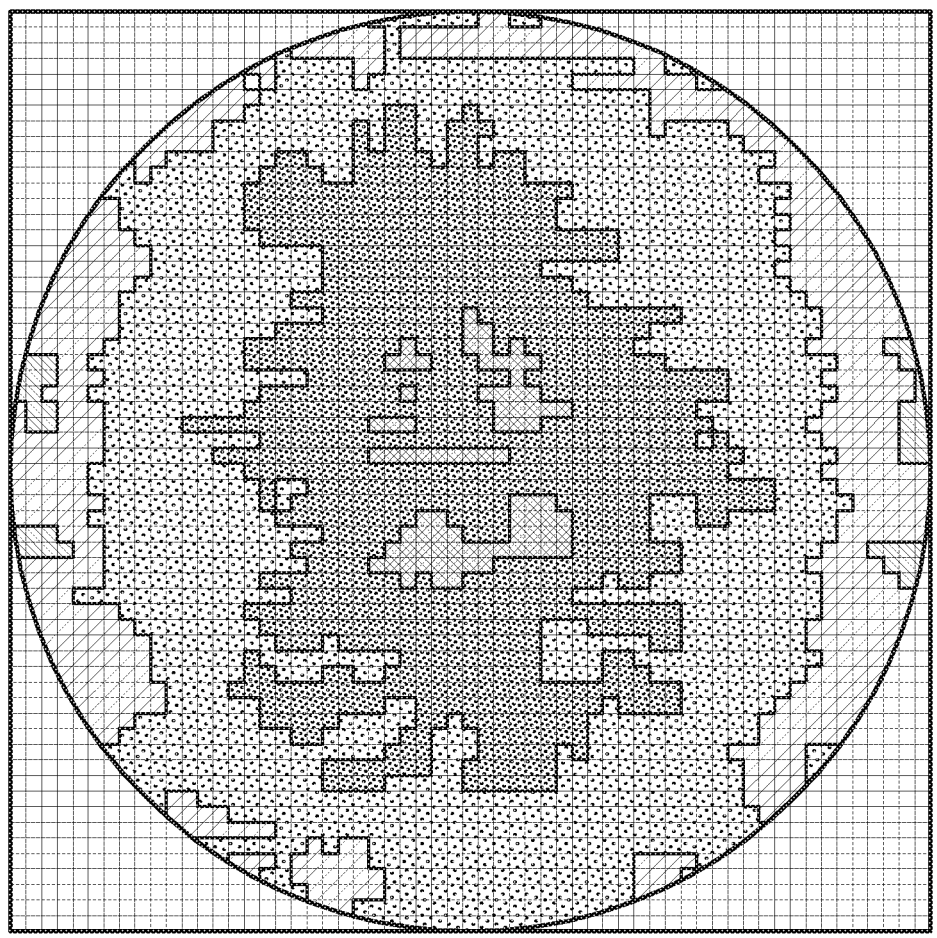
FIG. 2 shows an exemplary wafer map for a device feature for the example of an acceleration sensor with the device feature being a calibration value.

In FIG. 2, an example of a wafer feature map for one of the calibration parameters as an exemplary device feature is $STrim_{raw}$ is depicted.

Figure 3:
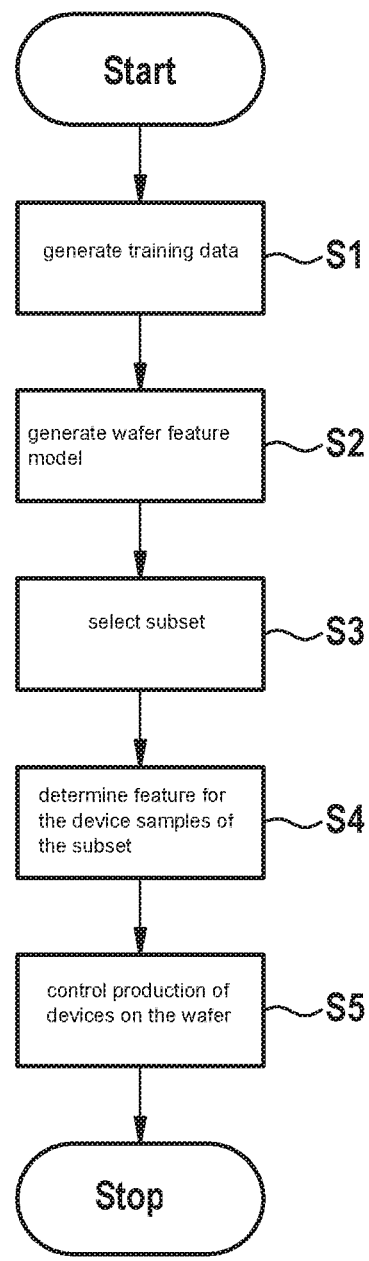
FIG. 3 shows a flowchart illustrating the example method for determining device features using a device feature model.

Below, an example method for controlling production of devices on a wafer by determining the device features for devices of the wafer is described in detail in conjunction with the flowchart of FIG. 3. The example method may be performed on a data processing system, having access to a database having stored training data for constructing the wafer feature model.

In step S1, the training data for the generation of the wafer feature model is generated by providing a number of processed wafers including acceleration sensors of the same type and variant. The wafers are produced using standard processing steps when they also may include one or more corner lot wafers which are wafers for which on purpose the fabrication process was slightly altered to emulate more extreme process variations.

From the obtained device features a wafer feature map is constructed. The wafer feature map substantially associates the position of the device on the wafer to one or more device features, which may include calibration parameters in the present example. Particularly, for each device feature a separate wafer feature map is constructed. An exemplary wafer feature maps (one per device feature), as shown in FIG. 2, forms the input base for generating the corresponding wafer feature model as a training data set. The training data set associates the wafer location of the devices on the wafer (x and y coordinates) and optionally environmental conditions such as temperature, humidity and the like, and operating conditions, such as an actual acceleration in the given example of an acceleration sensor to the device feature to be reflected by the wafer feature model.

Below, the example method is described further regarding a single device feature.

In step S2, the wafer feature model is generated which is trained by typical wafer feature maps with respective uncertainties, such that wafer locations and environmental and operating conditions are associated to a respective device feature according to the wafer feature model. Furthermore, the wafer feature model is non-parametric and should further provide an uncertainty value for the predicted feature. A preferred model type is a Gaussian process which can be trained to output smooth functions, model uncertainties, and which allows to incorporate prior knowledge, e.g., via a parametric mean function. The Gaussian process can be trained by the data set provided in step S1, e.g. by maximizing the log marginal likelihood $\text{argmax}_{\theta, \phi} p(y|\chi, \theta, \phi)$.

Instead of the use of a Gaussian process model, a multi-fidelity Gaussian process model can be used, where the initially measured samples may be used directly instead of a mean function using them.

One advantage of the use of a Gaussian process is that it automatically outputs the uncertainty for the prediction of the modelled device feature.

Basically, for efficient wafer testing/measuring, a subset $\chi_{samp}$ of devices of the same wafer $\chi_{samp} \subset \chi$ has to be selected from the set $\chi$ of all devices on the wafer, which indicates the specific devices to be tested/measured to obtain the respective actual device feature, while for the non-tested/non-measured devices the device feature is to be inferred. $\chi_{samp}$ corresponds a discrete subset of wafer positions and optionally environmental and further conditions, such as, for the given example, applied actual acceleration Acc and an operating temperature. The subset $\chi_{samp}$ should maximize the likelihood of all samples on the wafer being inside the specification limits $s_{acc}$ according to $$p(d(Acc, OTrim_y, OTrim_x, \ldots) \leq s_{acc}) \geq p_{min},$$

wherein $$d(OTrim_x, STrim_x, \quad . \quad . \quad . \quad) = |\text{Output}(Acc, OTrim_x, STrim_x, \ldots) - \text{Truevalue}(Acc)|$$

and $p_{min}$ is a lower bound on the minimum probability that the specification limit $s_{acc}$ is satisfied per sample.

Output(Acc) corresponds to the respective feature for the present example. The feature is a calibration parameter which has to be identified for each device on the wafer and wherein it needs to be evaluated whether the limits are respected.

$$p\left(\min_{OTrim_y, OTrim_x} d(OTrim_y, OTrim_x, \ldots) \leq s_{acc}\right) \geq p_{min}.$$

Then the violation can be specified as $$v = p\left(\min_{OTrim_y, OTrim_x} d(OTrim_y, OTrim_x, \ldots) \leq s_{acc}\right).$$

As this violation will be different for different electric responses, the violation can be specified for all predicted values $\mathcal{Y}$.

$v: \mathcal{Y} \rightarrow [0,1]$ denoted by $v(y)$

In general, the selected discrete subset $\chi_{samp}$ of wafer positions is selected by maximizing the likelihood of all samples on the wafer being inside given specification limits $s_{lim}$ according to $$p(d(y) \leq s_{lim}) \geq p_{min}$$

wherein $$d(y) = \sum_{i \in X} |y_{mod}(i) - y_{des}|$$

and $p_{min}$ is a lower bound on the minimum probability that the specification limit $s_{lim}$ is satisfied per sample, wherein X is the set of all wafer positions, $\mathcal{Y}_{mod}$ is a modelled feature and $\mathcal{Y}_{des}$ is the nominal feature which shall be met for the device at the specific position i.

Furthermore, a limit violation v may be specified as $$v = p\left(\min_{y_{mod}(i)} d(y) \leq s_{acc}\right)$$

wherein the subset $\chi_{samp}$ of wafer positions is selected to minimize the probability of expected limit violations over all devices of the wafer.

In the next step S3, for efficient wafer sample testing/measurement, the subset $\chi_{samp} \subset \chi$ of a size $|\chi_{samp}|$ is selected. The subset $\chi_{samp}$ is chosen to minimize the expected limit violations v over all devices of the wafer. Hereby, a kind of acquisition function a according to a Bayesian optimization algorithm is specified on the sample subsets $\chi_{samp}$ that should minimize limit violations v after the expected improvement of the Gaussian process posterior when adding the new measurements to the Gaussian process and assuming that their corresponding $y_{samp}$ values will be distributed according to the Gaussian process prediction.

The Gaussian process prediction of the features of the devices of the wafer for given environmental and/or operating conditions (acceleration and temperature in the present example) is $p(\mathcal{Y}|\chi, \mathcal{D}, \theta, \phi)$ with $\mathcal{D}$ is the actual subset $\chi_{samp}$ which has been acquired so far.

The Gaussian process prediction is updated with the new measurements $\mathcal{Y}_{samp}$ at the sample positions $\chi_{samp}$ according to $p(\mathcal{Y}|\chi, \mathcal{D}, \chi_{samp}, \mathcal{Y}_{samp}, \theta, \phi)$. The acquisition function used reads:

$$a(\chi_{samp}) = \mathbb{E}_{\mathcal{Y}_{samp} \sim p(\mathcal{Y}|\chi, \mathcal{D}, \theta, \phi)}[v(y_{samp})] - \mathbb{E}_{y \sim p(\mathcal{Y}|\chi, \mathcal{D}, \omega_{samp}, \mathcal{Y}_{samp}, \theta, \phi)}[v(y)]]$$

For choosing the optimized sample devices subset $\chi_{samp}$, the acquisition function a has to be evaluated for all possible combinations of sample devices (indicated by its wafer positions) wherein the subset with the lowest expected limit violation is selected. As Gaussian processes can predict the feature for non-tested/non-measured devices, the testing/measuring time can be significantly reduced with respect to the testing/measuring time for all devices on the wafer.

In a next step S4, the feature is determined for the device samples of the subset $\chi_{samp}$. The wafer feature model is updated, and the expected limit violation across the wafer can be evaluated again. If the result is appropriate, the testing can be stopped, otherwise the newly measured device feature of the subset can be added to the existing subset D, and the process can be continued with step S3.

In step S5 the production of devices on the wafer 1 is controlled depending on the device feature. In case the device feature is a calibration parameter, it may be stored in the calibration setup memory of the respective device.

Furthermore the device features may include test information, such as an electrical parameter. Depending on the test information the respective device associated to the device feature may be classified or rejected. For instance, a rejection threshold can be defined, wherein the device is rejected when the test information exceeds the rejection threshold.

Further, controlling the production may include that the production of the devices is halted depending on the respective device features of the devices. The device features may include a test information. If it is found that the aggregated test information of the devices 2 of a wafer 1 exceeds a given interrupt threshold the production may be stopped.

It is further possible to implement priors for the patterns of the device feature of the respective wafer feature map based on prior technological knowledge of the fabrication steps using the processing equipment, such as known radial or angular dependencies of trench angle/etch loss and the like. This allows to include prior knowledge into the establishing of the wafer feature model.

Additionally, using Active Learning allows to identify at which wafer positions sample parts may be placed to obtain a low uncertainty prediction by keeping the number of sample parts at a minimum. To achieve this, Active Learning iteratively chooses the sample that currently has the highest prediction uncertainty and updates the model after measuring it.

What is claimed is:

1. A computer-implemented method for determining a device feature of a device produced on a wafer, comprising the following steps:
   providing a wafer feature model associating a wafer position indicating a position of a produced device on the wafer to a device feature, wherein the wafer feature model is configured to be trained by one or more wafer feature maps and is configured as a Gaussian process model;
   providing a sample device feature of at least one device at a sample wafer position; and
   determining the device feature of at least one other device of the wafer, depending on the provided wafer feature model;
   wherein the sample device feature of the at least one device is obtained at a selected discrete subset of wafer positions which is selected using active learning and which maximizes a likelihood of all samples on the wafer being inside given specification limits.

2. The method according to claim 1, wherein the device feature includes one of: (i) an indication of functionality, or (ii) an indication of an error, or (iii) an indication whether the device fulfils a given specification, or (iv) a calibration parameter to be stored into the device.

3. The method according to claim 1, wherein the wafer feature model additionally associates environmental conditions to the device feature and/or operating conditions to the device feature.

4. The method according to claim 1, wherein the wafer feature model is trained by providing a number of processed wafers including identical devices, wherein the processed wafers include one or more corner lot wafers.

5. The method according to claim 1, wherein the wafer feature model is non-parametric and provides an uncertainty value for a predicted feature.

6. The method according to claim 1, wherein the selected discrete subset of wafer positions is selected by maximizing the likelihood of all samples on the wafer being inside given specification limits $s_{lim}$ according to $$p(d(f) \leq s_{lim}) \geq p_{min}$$

wherein $$d(f) = \sum_{i \in X} |f_{mod}(i) - f_{des}|$$

and $p_{min}$ is a lower bound on the minimum probability that the specification limit $s_{lim}$ is satisfied per sample, wherein X is a set of all wafer positions, $f_{mod}$ is a modelled feature and $f_{des}$ is a nominal feature which is met for the device at the specific position i.

7. The method according to claim 6, wherein a limit violation v is specified as $$v = p\left(\min_{f_{mod}(i)} d(f) \leq s_{acc}\right)$$

wherein the subset of wafer positions is selected to minimize a probability of expected limit violations over all devices of the wafer.

8. The method according to claim 7, wherein the set of wafer positions is updated using an acquisition function $$\alpha(\chi_{samp}) = \mathbb{E}_{\psi_{samp} \sim p(\psi_{|\chi}} \mathcal{D}_{\theta,\phi})[\nu(y_{samp}) - \mathbb{E}_{y \sim p(\psi, \mathcal{D}, \chi_{samp}, \psi_{samp} \theta, \phi)}[\nu(y)]]$$

wherein the selecting of the wafer position for an optimized subset of wafer positions, the acquisition function is evaluated for all possible combinations of wafer positions, wherein the subset of wafer positions with a lowest expected limit violation is selected.

9. The method according to claim 6, wherein the device feature model is provided by using a prior for the patterns of corresponding device features based on prior technological knowledge of fabrication steps using processing equipment.

10. A computer-implemented method for production of devices on a wafer, comprising the following steps:
controlling a production of the devices on one or more wafers;
determining a respective device feature for each of the devices by:
providing a wafer feature model associating a wafer position indicating a position of a produced device on the wafer to a device feature, wherein the wafer feature model is configured to be trained by one or more wafer feature maps and is configured as a Gaussian process model;
providing a sample device feature of at least one device at a sample wafer position;
determining the device feature of at least one other device of the wafer, depending on the provided wafer feature model;
wherein the sample device feature of the at least one device is obtained at a selected discrete subset of wafer positions which is selected using active learning and which maximizes a likelihood of all samples on the wafer being inside given specification limits;
wherein the production of the devices is controlled depending on the determined device feature.

11. The method according to claim 10, wherein the production of the devices is controlled in that one of:
the respective device feature is written into a memory of the devices as a respective calibration parameter; or
depending on the respective device feature, devices are classified and/or rejected; or
the production of the devices is halted depending on the respective device features of the devices.

12. A system for determining a device feature of a device produced on a wafer, wherein the system is configured to:
provide a wafer feature model associating a wafer position indicating a position of a produced device on a wafer to a device feature, wherein the wafer feature model is configured to be trained by one or more wafer feature maps and is configured as a Gaussian process model;
provide a sample device feature of at least one device at a sample wafer position; and
determine the device feature of at least one other device of the wafer depending on the provided wafer feature model, wherein the sample device feature of the at least one device is obtained at a selected discrete subset of wafer positions which is selected by active learning and which maximizes a likelihood of all samples on the wafer being inside given specification limits.

13. A system for production of devices on a wafer, wherein the system is configured to:
control a production of the devices on one or more wafers;
providing a wafer feature model associating a wafer position indicating a position of a produced device on a wafer to a device feature, wherein the wafer feature model is configured to be trained by one or more wafer feature maps and is configured as a Gaussian process model;
providing a sample device feature of at least one device at a sample wafer position;
determining the device feature of at least one other device of the wafer depending on the provided wafer feature model, wherein the sample device feature of the at least one device is obtained at a selected discrete subset of wafer positions which is selected using active learning and which maximizes a likelihood of all samples on the wafer being inside given specification limits;
wherein the system is further configured to control production of the devices depending on the determined device feature.

14. A non-transitory machine-readable storage medium on which is stored a computer program for determining a device feature of a device produced on a wafer, the computer program, when executed by a computer, causing the computer to perform the following steps:
providing a wafer feature model associating a wafer position indicating a position of a produced device on the wafer to a device feature, wherein the wafer feature model is configured to be trained by one or more wafer feature maps and is configured as a Gaussian process model;
providing a sample device feature of at least one device at a sample wafer position; and
determining the device feature of at least one other device of the wafer, depending on the provided wafer feature model;
wherein the sample device feature of the at least one device is obtained at a selected discrete subset of wafer positions which is selected using active learning and which maximizes a likelihood of all samples on the wafer being inside given specification limits.

* * * * *